US012583000B2

(12) United States Patent
Brawley

(10) Patent No.: US 12,583,000 B2
(45) Date of Patent: Mar. 24, 2026

(54) PORTABLE WATER HEATER AND DISPENSER

(71) Applicant: Tom Brawley, Conway, AR (US)

(72) Inventor: Tom Brawley, Conway, AR (US)

( * ) Notice: Subject to any disclaimer, the term of this patent is extended or adjusted under 35 U.S.C. 154(b) by 80 days.

(21) Appl. No.: 18/484,445

(22) Filed: Oct. 11, 2023

(65) Prior Publication Data

US 2025/0121388 A1 Apr. 17, 2025

(51) Int. Cl.

*B05B 9/00* (2006.01)
*A47K 3/28* (2006.01)
*B05B 9/04* (2006.01)
*F24H 1/06* (2022.01)
*F24H 1/08* (2022.01)

(52) U.S. Cl.

CPC ............ *B05B 9/002* (2013.01); *B05B 9/0403* (2013.01); *A47K 3/288* (2013.01); *F24H 1/06* (2013.01); *F24H 1/08* (2013.01)

(58) Field of Classification Search

CPC ....... B05B 9/002; B05B 9/0403; B05B 9/007; F22D 7/04; F22D 7/00; A47K 3/288; A47K 3/28; F24H 9/2035; F24H 1/145; F24H 9/13; F24H 1/08; F24H 1/07; F24H 1/06; F24H 1/14

USPC .............. 4/616, 598, 603; 222/146.2, 146.1; 239/133, 130, 135; 122/19.2, 18.4, 13.01, 122/13.3, 17.1

See application file for complete search history.

(56) References Cited

U.S. PATENT DOCUMENTS 3,629,875 A * 12/1971 Dow ...................... A47K 3/325 D25/19
4,344,571 A * 8/1982 Kundig .................. B05B 15/25 239/130
7,506,386 B1 * 3/2009 Adrian ...................... F24H 1/08 122/18.1
9,921,012 B2 * 3/2018 Fujimoto ................ F24H 15/31

* cited by examiner

*Primary Examiner* — David J Walczak
(74) *Attorney, Agent, or Firm* — David Gershner

(57) ABSTRACT

A portable water heater and dispenser which is configured to be readily movable and may heat and dispense potable water for the user. This system may feature a protective case for housing a pump and water heater unit for dispensing water which has been heated above ambient temperature. The system may also feature a mounting plate to which a pump and heater are assembled and attached such that the assembled unit may be moved as a unit and attached to a protective case or a suitable surface.

9 Claims, 6 Drawing Sheets

PORTABLE WATER HEATER AND DISPENSER

BACKGROUND OF THE INVENTION

The present invention is in the technical field of water heating and dispensing. More particularly, the present invention is in the technical field of portable water heating and dispensing units.

Overland travel has become an increasingly common event for recreational purposes and sometimes out of necessity. It involves traveling long distances often far civilization. A reliable water supply is a necessity for this type of travel and a means for heating an dispensing such water is a luxury. Currently available devices allow for storage of small amounts of water but do not provide a ready means of reliably heating and dispensing the water from the storage tank.

The present invention is a self-contained, portable device which stores heats and dispenses water on demand.

SUMMARY OF THE INVENTION

The present invention is a device designed to be mounted to a vehicle and heat and dispense clean water. The present invention is further designed to be a fully self-contained unit which may easily be moved from one mounting location or application to another.

The advantages of the present invention include, without limitation, that it is simple to manufacture, simple in installation and operation, is substantially more secure in its attachment to a vehicle than existing devices, is a complete self-contained unit, and provides heating of the water for dispensation.

DETAILED DESCRIPTION OF THE INVENTION

Figure 1:
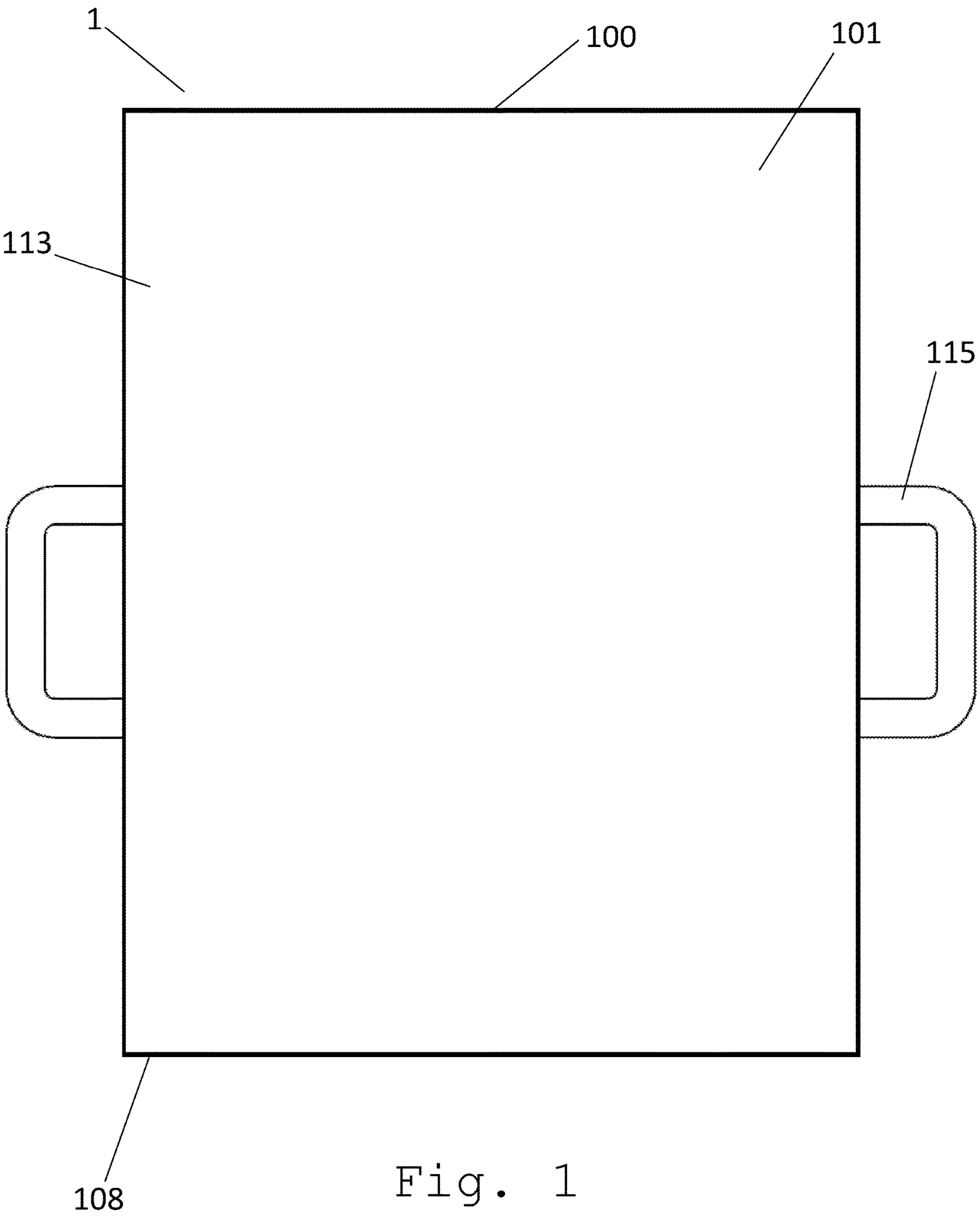
FIG. 1 depicts a front view of a first embodiment of the present invention.
Figure 2:
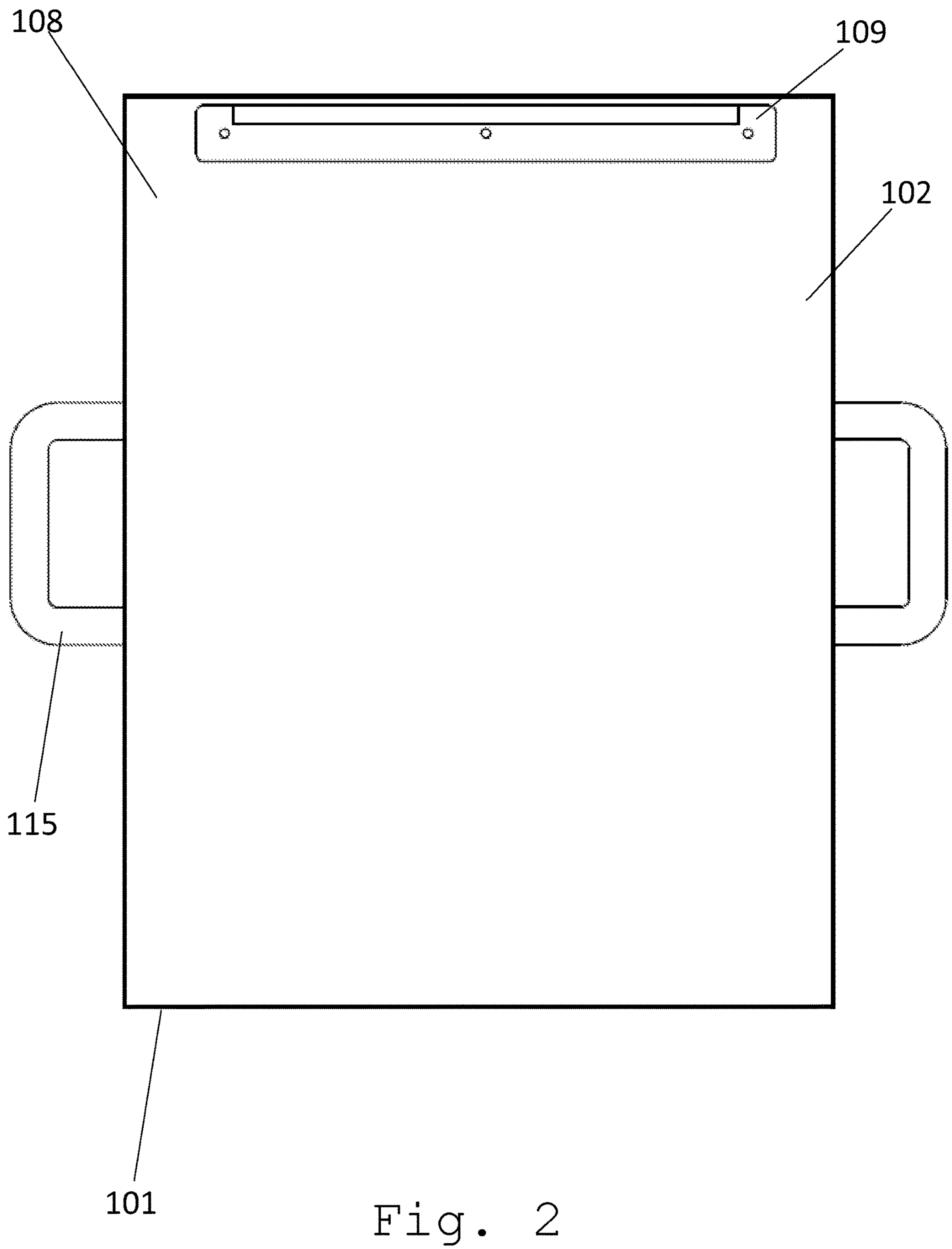
FIG. 2 depicts a back view of a first embodiment of the present invention.
Figure 3:
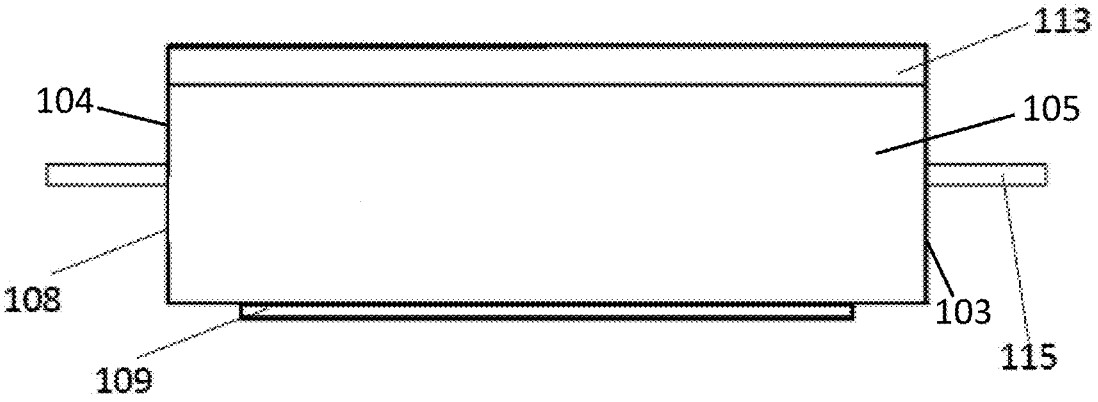
FIG. 3 depicts a top view of a first embodiment of the present invention.

Referring to the drawings, FIGS. 1-6 depict a first embodiment of a portable heater and dispenser 1 which has a case 100, a pump 200, and a heater 300.

Referring to the drawings, FIGS. 1-5 depict case body 101. The case body 101 takes the general form of a rectangular prism which is open on one side and is preferably made of metal or rigid plastic, but other rigid or semi-rigid material may be used. While the case body 101 generally takes the shape of a rectangular prism, it may feature either rounded or squared corners. The case body 101 has a back wall 102, left wall 103, right wall 104, top wall 105, and bottom wall 106. As the shape of the case body 101 is open on one side, the concave portion of the case body 101 is the interior 107 of the case body with the convex portion opposite the interior 107 is the exterior 108 of the case body.

Figure 4:
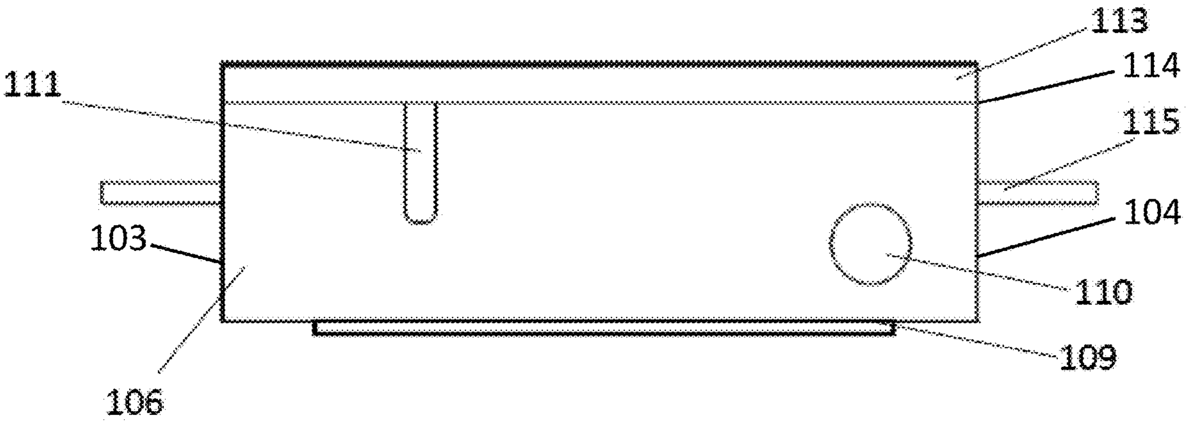
FIG. 4 depicts a bottom view of a first embodiment of the present invention.
Figure 5:
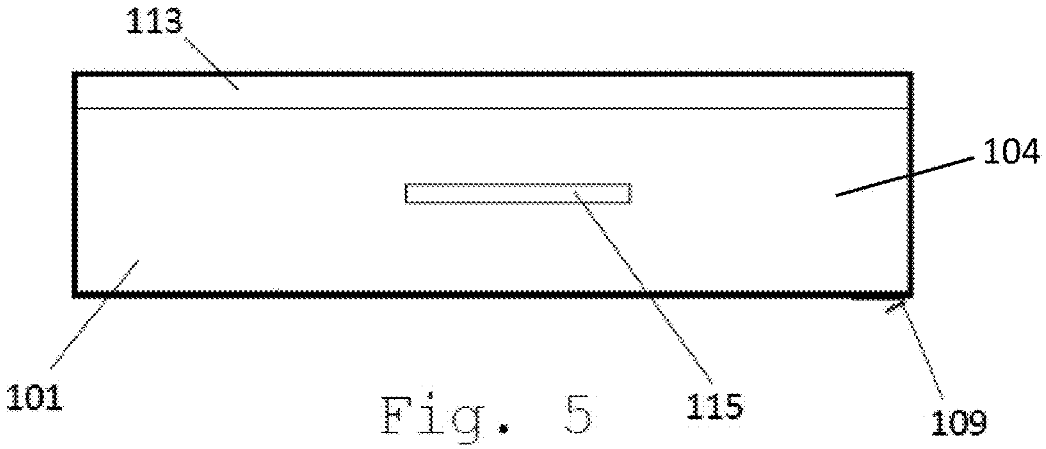
FIG. 5 depicts a right side view of a first embodiment of the present invention.

The case body 101 has a mount 109 located on the exterior 108 of the back wall 102 of the case body. The preferred embodiment is a cleat, but hooks, mounting holes, or other mounting devices or means known in the art may be used. The case body 101 also features a water port 110 which is a perforation located in the bottom wall 106 and is preferably circular, but may be another shape. The case body 101 additionally features a fuel port 111 which is a perforation located in the bottom wall 106 and is preferably configured as an elongated slot which extends to the edge of the bottom wall as depicted in FIG. 4, but may be another shape.

The case 100 may also feature one or more partitions 112 which are affixed to the interior 107 of the case body and extend vertically from the back wall 102 of the case body 101 into the interior of the case. The case 100 also has a lid 113 which is removably attached to the case 101. The preferred method of attachment is via continuous hinge 114, but other means of removable attachment known in the art may be used. The case 100 may also feature a handle 115 affixed to the exterior 108 of the case body 101.

Figure 6:
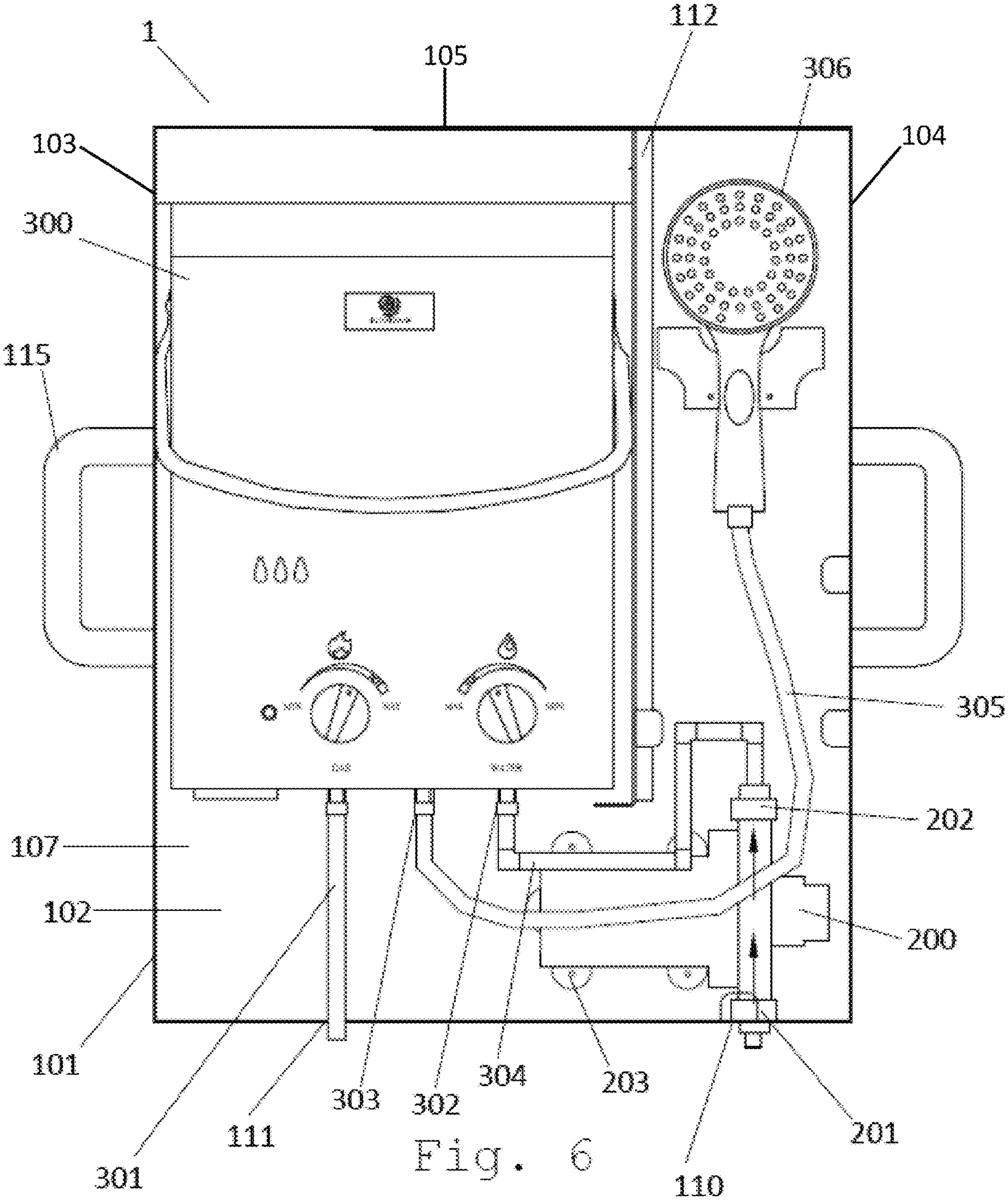
FIG. 6 depicts a front view of a first embodiment of the present invention with the lid removed from the case.

Referring to the drawings, FIG. 6 depicts the pump 200. The pump 200 is preferably a 12 volt electric pump which is readily available and known in the art. Other pumps which utilize other power sources may also be used. The pump is attached to the back wall 102 of the case proximate the water port 110. The pump 200 features an inlet 201 and an outlet 202. When mounted to the back wall 102 of the case, it should be oriented such that the inlet is proximate the water port 110. The pump 200 may also comprise one or more separate mounting brackets 203 for affixing the pump 200 to the back wall 102 of the case. Alternately, the pump may be directly affixed to the case without a separate mounting bracket 203.

Referring to the drawings, FIG. 6 depicts the heater 300. The heater 300 is preferably fueled by a fuel source which is preferably liquid propane gas (LPG). Other heaters which utilize other combustible fuels or power sources may also be used. The pump is attached to the back wall 102 of the case proximate the fuel port 11. The heater 200 features a fuel input 301, water input 302 and a water output 303. When mounted to the back wall 102 of the case, the heater should be oriented such that the fuel input 301 is proximate the fuel port 111. The heater 300 may also feature an input hose 304 which is preferably comprised of flexible tubing but may be rigid tubing or other readily available material for transporting fluid, which is affixed on one end to the water input 302 and at the other end to the outlet 202 of the pump 200. The heater 300 may also feature an output hose 305 which is preferably comprised of flexible tubing which is affixed on one end to the water output 303 and at the other end to a dispenser wand 306 which is preferably configured with one or more nozzles for dispensing water which has passed through the heater.

To operate this embodiment of the portable heater and dispenser 1, the unit should be mounted to a suitable surface via the mount 109. A water source is connected to the inlet 201 of the pump 200 and a fuel source is connected to the fuel port of the heater 300. The pump 200 is connected to the heater by means of an input hose 304 connected to the pump outlet 202 at one end and the heater's water input 302 at the other. The heater 300 and pump 200 should both be turned on such that water is pumped through the pump 200 and into the heater 300 via the input hose 304. After being warmed by the heater 200, the water will flow out of the output hose 305 and dispenser wand 306 (if equipped) such that warm water may be dispensed.

Figure 7:
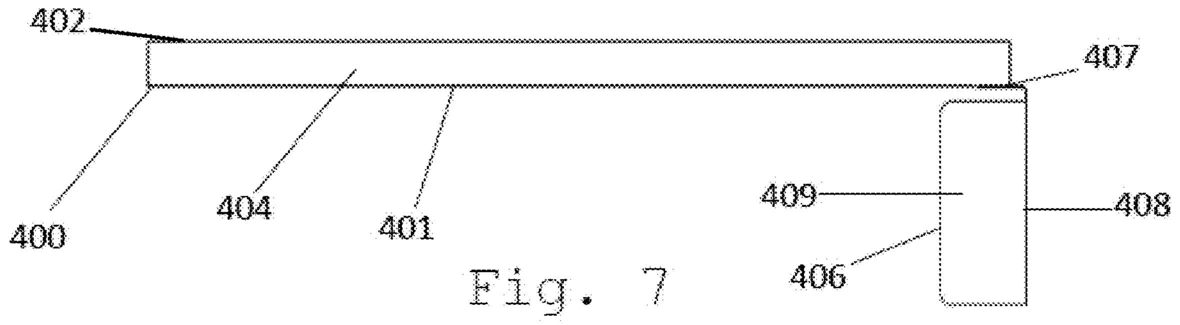
FIG. 7 depicts a left side view the mounting plate of a second embodiment of the present invention.
Figure 8:
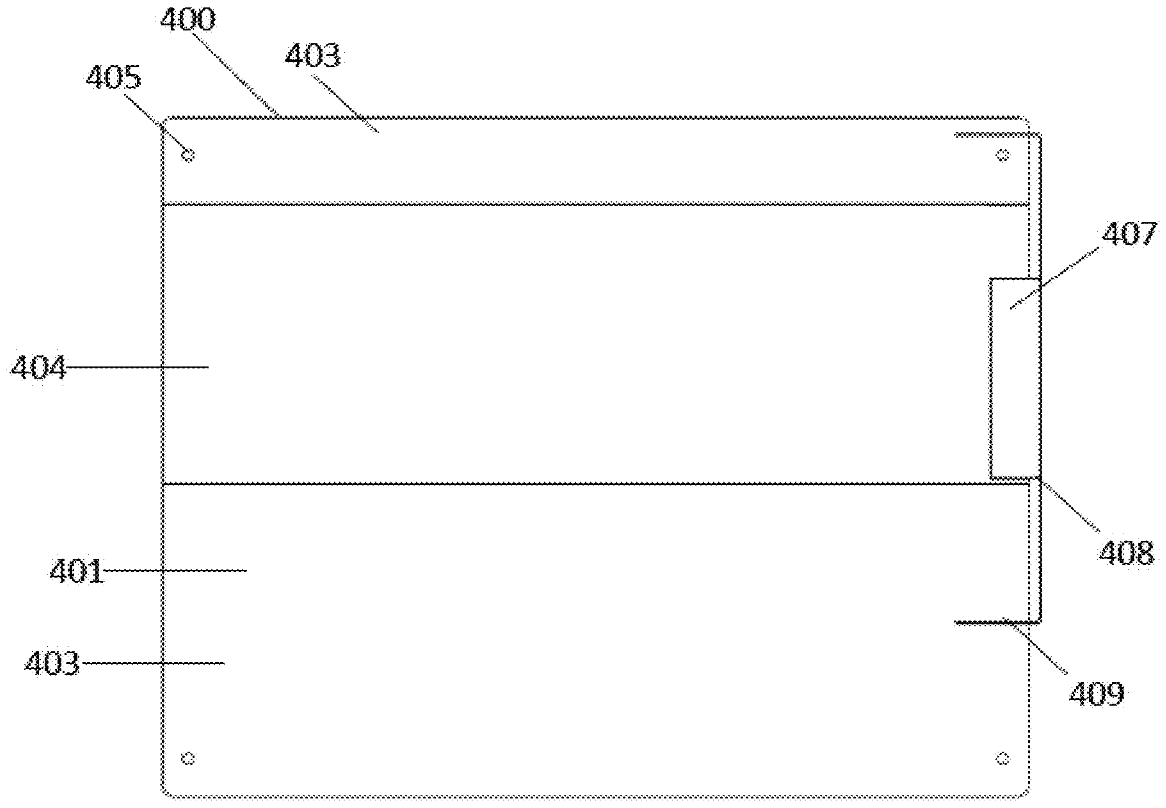
FIG. 8 depicts a front view of the mounting plate of a second embodiment of the present invention.
Figure 9:
FIG. 9 depicts a top end view of the mounting plate of a second embodiment of the present invention.
Figure 10:
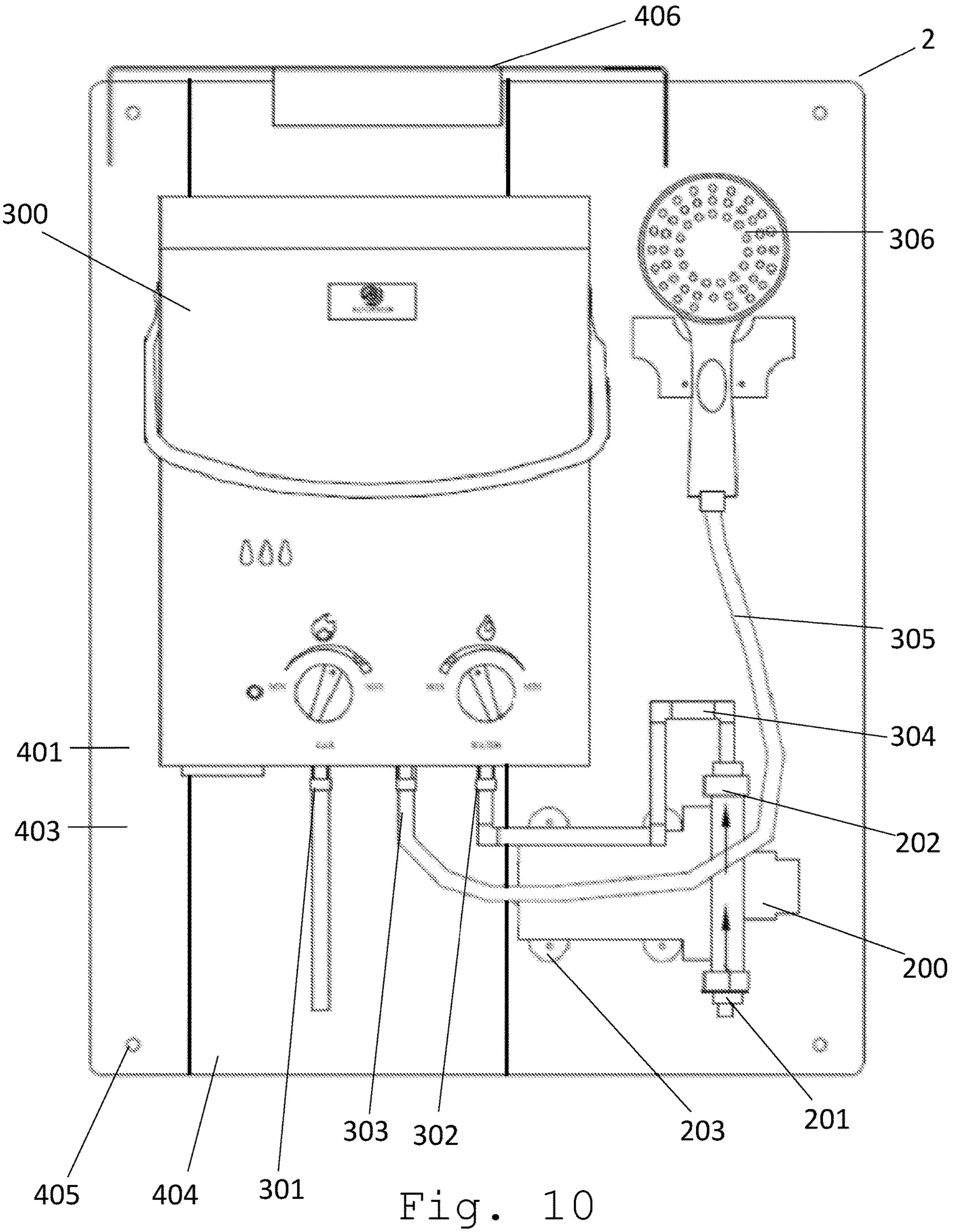
FIG. 10 depicts a front view of a second embodiment of the present invention.

Referring to the drawings, FIG. 10 depicts a second embodiment of the portable heater and dispenser 2 which features a mounting plate 400. The mounting plate 400 has a front side 401 and a back side 402. The plate 400 is preferably made of metal, plastic or other rigid material. The plate 400 is generally rectangular in shape and has a main plane 403 and a raised section 404 which extends outwardly from the main plane 403 and is configured such that the raised section 404 is convex on the front side 401 and concave on the back side. The raised section 404 is preferably located such that it runs axially the full length of the mounting plate 400. The mounting plate may also feature one or more mounting holes 405 located proximate the outer edges of the mounting plate 400. The mounting plate 400 may also feature a heat shield 406 with a mounting tab 407, a main shield 408 which extends perpendicularly from the mounting tab 407. The main shield 408 is preferably substantially flat and may feature end sections 409 which are configured at an angle from the main shield 408. The heat shield 406 is affixed to the raised section 404 proximate the edge of the mounting plate 400. The heat shield is preferably attached and configured as shown in FIGS. 7-8. The heat shield is preferably made of the same material as the mounting plate 400, but may be made of any rigid and heat resistant material which is known in the art.

As depicted in FIG. 10, in the second embodiment of the portable heater and dispenser 2, the heater 300 is affixed to the raised section 404, proximate the heat shield 406, and the pump 200 is affixed to the main plane 403. The second embodiment may also feature a dispenser wand 306 which is removably attached to the main plane 403. This second embodiment 2 is configured such that the plate may be mounted or affixed to any surface or may be mounted to the inside of a suitable rigid case such as those known in the art or the case 100 as described herein.

To operate this second embodiment of the portable heater and dispenser 2, a water source is connected to the inlet 201 of the pump 200 and a fuel source is connected to the fuel port of the heater 300. The pump 200 is connected to the heater by means of an input hose 304 connected to the pump outlet 202 at one end and the heater's water input 302 at the other. The heater 300 and pump 200 should both be turned on such that water is pumped through the pump 200 and into the heater 300 via the input hose 304. After being warmed by the heater 200, the water will flow out of the output hose 305 and dispenser wand 306 (if equipped) such that warm water may be dispensed.

While this invention has been described with the specific embodiments outlined above, the preferred embodiments set forth are intended to be illustrative, not limiting. Various changes may be made without departing from the scope of the invention as defined in the following claims. The claims provide the scope of coverage of this invention and should not be limited to the specific examples cited above.

What is claimed is:

1. A portable water heater and dispenser system comprising:

a case comprising a case body with a water port located in a bottom wall of the case body and a fuel port located in the bottom wall of the case body, a lid, and a mount located on an exterior of a back wall of the case body and configured to mount the system to a surface;

a pump comprising an inlet and an outlet, which is located in an interior of the case body and attached to said interior of the case body and configured such that the inlet is located proximate to and is routed through the water port;

a heater featuring a fuel input, a water input, and a water output, which is located in an interior of the case body and attached to said interior of the case body and configured such that the fuel input is located proximate to and is routed through the fuel port; and further configured such that the water input is connected to the pump outlet via an input hose; and an output hose connected to the water output of the heater which is configured to dispense water.

2. The portable water heater and dispenser system of claim 1 further comprising a dispenser wand.

3. The portable water heater and dispenser system of claim 1 where the case body further comprises one or more partitions which extend from a back wall of the case body into an interior of the case body.

4. The portable water heater and dispenser system of claim 1 where the case further comprises one or more handles.

5. A portable water heater and dispenser system comprising:

a mounting plate comprising a main plane and a raised section configured such that the raised section is a full length of the mounting plate and further configured such that a front side of the mounting plate is oriented such that the raised section is convex and that a back side of the mounting plate is oriented such that the raised section is concave;

a pump comprising an inlet and an outlet, which is attached to the front side of the mounting plate on the main plane;

a heater featuring a fuel input, a water input, and a water output, which is attached to the front side of the mounting plate on the raised section and configured such that the water input is connected to the pump outlet via an input hose; and an output hose connected to the water output of the heater which is configured to dispense water.

6. The portable water heater and dispenser system of claim 5 further comprising a dispenser wand which is removably affixed to the main plane of the mounting plate.

7. The portable water heater and dispenser system of claim 5 further comprising mounting holes located proximate the outer edges of the main plane of the mounting plate.

8. The portable water heater and dispenser of claim 5 wherein the mounting plate is affixed to a back wall of a case comprising a case body with a water port located in a bottom wall of the case body and configured such that the pump's inlet is located proximate to and is routed through the water port and a fuel port located in the bottom wall of the case body and configured such that the fuel input is located proximate to and is routed through the fuel port, a lid, and a mount located on an exterior of a back wall of the case body and configured to mount the system to a surface.

9. The portable water heater and dispenser system of claim 8 further comprising a dispenser wand which is removably affixed to the main plane of the mounting plate.

* * * * *